United States Patent [19]

Beeler

[11] Patent Number: 4,779,856

[45] Date of Patent: Oct. 25, 1988

[54] TEACHING APPARATUS FOR DETERMINING PROPER MEASUREMENTS FOR CONNECTING TWO PIECES OF PIPE

[76] Inventor: Robert Beeler, 1230 High Street, Oroville, Calif. 95965

[21] Appl. No.: 79,942

[22] Filed: Jul. 31, 1987

[51] Int. Cl.4 .............................................. B25B 1/20
[52] U.S. Cl. ....................................... 269/45; 269/60; 269/61; 269/71; 269/78; 269/287
[58] Field of Search ....................... 269/78, 60, 61, 71, 269/37, 43, 45, 287, 132, 126

[56] References Cited

U.S. PATENT DOCUMENTS

| | | | |
|---|---|---|---|
| 1,875,761 | 9/1932 | Power | 269/71 |
| 2,185,322 | 1/1940 | Anderson | 269/37 |
| 2,674,966 | 4/1954 | Morris | 269/287 |
| 2,936,803 | 5/1960 | Jorick | 269/45 |
| 3,463,137 | 8/1969 | Hare | 269/60 |
| 4,236,702 | 12/1980 | Keddie | 269/307 |
| 4,500,235 | 2/1985 | Johnsen | 269/43 |

*Primary Examiner*—Robert C. Watson
*Attorney, Agent, or Firm*—Mark C. Jacobs

[57] ABSTRACT

A teaching apparatus for teaching how to take measurements to connect two pieces of pipe whether or not such pieces are offset from each other or in a straight line. The apparatus includes a main support, an upstanding post laterally movable on the main support, a first pipe section holder on the post selectively movable vertically therealong and a sub-support spaced from the main support having an upstanding flange member laterally movable on the sub-support having a second pipe section holder thereon angularly adjustable with respect to the flange member on the sub-support. The pipe section holders can be used to clamp a pipe section therein and adjusted to set up a predetermined spacing and angular relationship between the unconnected pipe sections. The angularity of the main support and the sub-support in their horizontal planes can also be adjusted. In this manner, the apparatus can be used to teach the interconnection of the pipe sections or to actually determine the proper coupling therebetween.

13 Claims, 3 Drawing Sheets

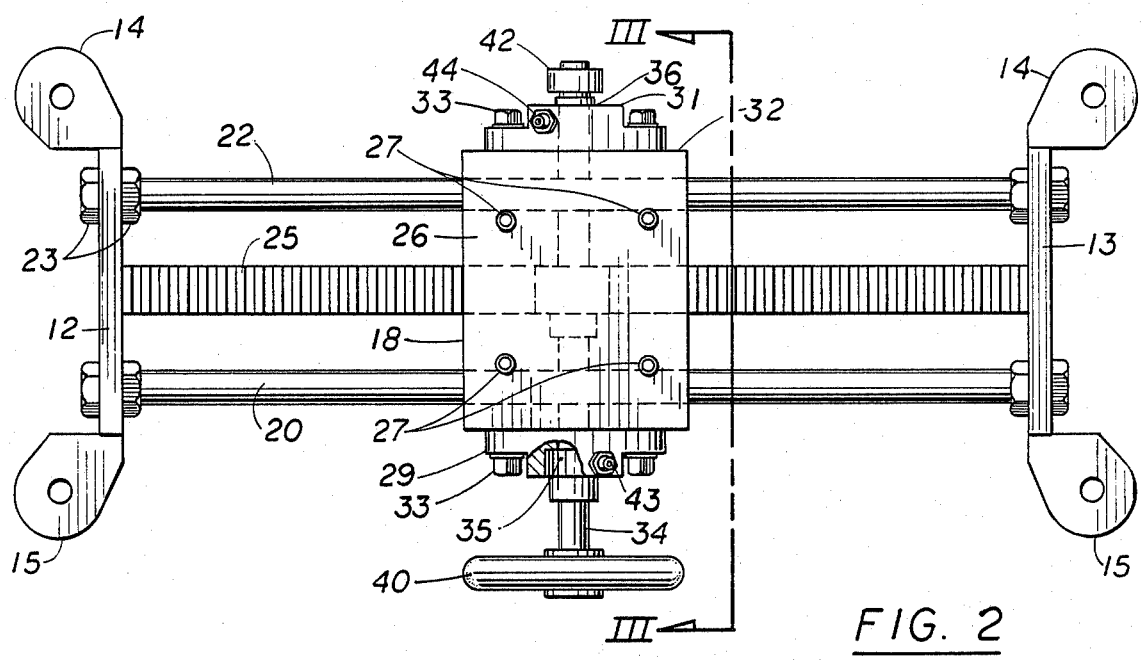
FIG. 2
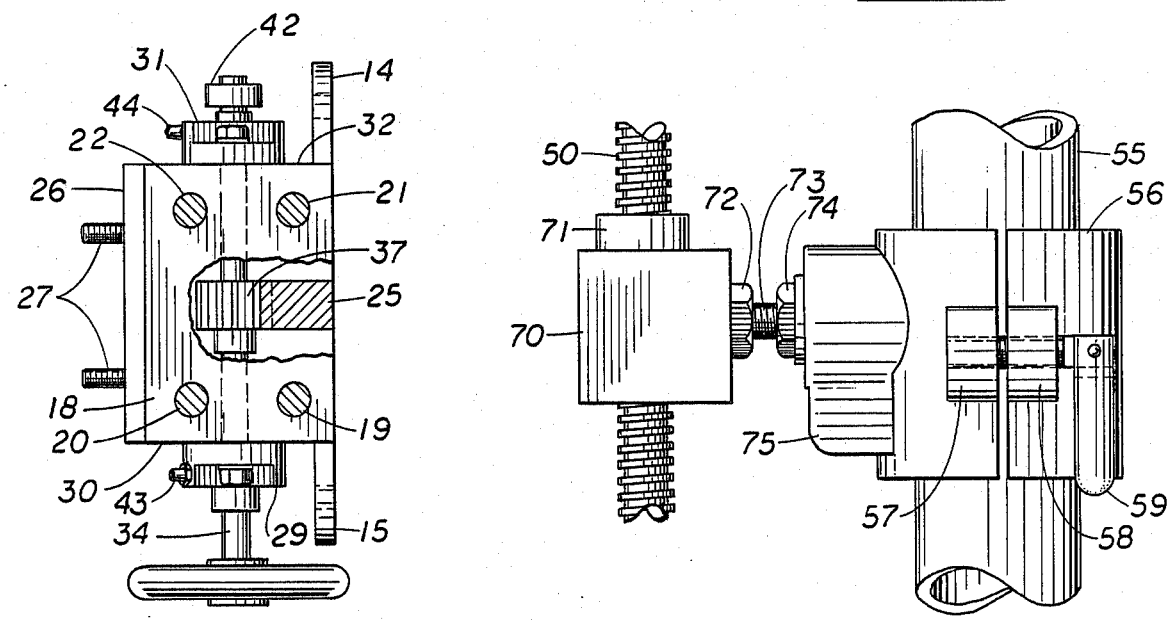
FIG. 3
FIG. 4
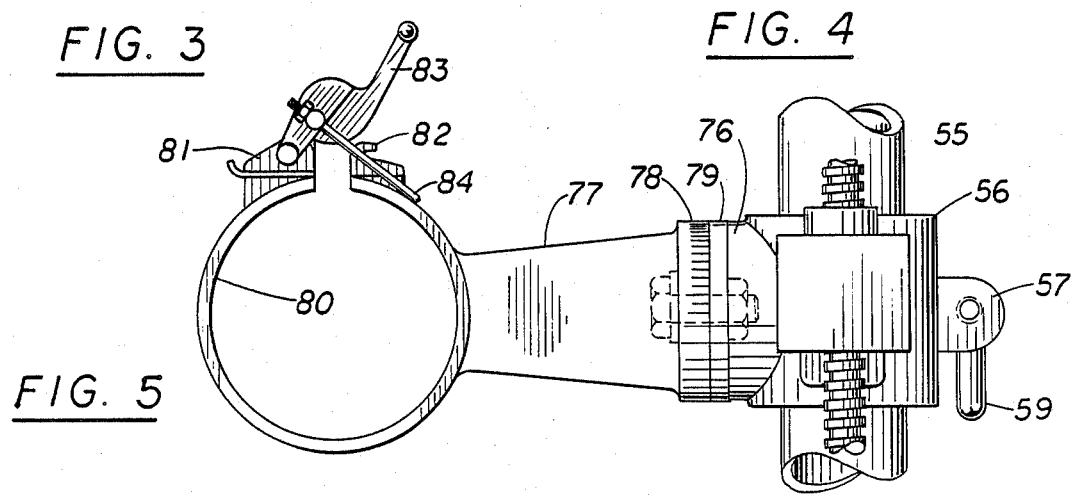
FIG. 5

TEACHING APPARATUS FOR DETERMINING PROPER MEASUREMENTS FOR CONNECTING TWO PIECES OF PIPE

BACKGROUND OF THE INVENTION

The invention relates to teaching apparatus for determining proper measurements for connecting two pieces of pipe.

DESCRIPTION OF THE PRIOR ART

It is often necessary in certain pipe operations, such as plumbing, to join pipe sections together with a predetermined bend on one or both of the sections to be joined. Various techniques and apparatuses have been suggested over the years to carry out the same. Generally, such bending is carried out in the field by using large templates or line of sight judgements. Such templates must be very large to have all possible guidelines printed thereon and thus is cumbersome and expensive and may still not have the desired curvature printed thereon. Line of sight judgements, of course, may not be accurate and require rebending if the variances are too great.

In U.S. Pat. No. 3,776,539, a plastic pipe bending jig is disclosed. This device is merely used to form a particular bend in a pipe and cannot be used to teach what type of connection is required between two separate unconnected pipe sections. There is thus a need for apparatus for teaching an apprentice how to determine pipe connectors and how to form such connectors in a bench environment with subsequent recreation out in the field.

SUMMARY OF THE INVENTION

It is an object of this invention to provide apparatus for teaching a pipefitting apprentice how to take measurements to connect up two unconnected pipe sections.

It is a further object of this invention to provide apparatus for making bench tests for connecting up unconnected pipe sections which parameters can be recreated in the field to make actual connectors.

These and other objects are preferably accomplished by providing a main support, an upstanding post laterally movable on the main support, a first pipe section holder on the post selectively movable vertically therealong and a sub-support spaced from the main support having an upstanding flange member laterally movable on the sub-support having a second pipe section holder thereon angularly adjustable with respect to the flange member on the sub-support. The pipe section holders can be used to clamp a pipe section therein and adjusted to set up a predetermined spacing and angular relationship between the unconnected pipe sections. The angularity of the main support and the sub-support in their horizontal planes can also be adjusted. In this manner, the apparatus can be used to teach the interconnection of the pipe sections or to actually determine the proper coupling therebetween.

BRIEF DESCRIPTION OF THE DRAWING

FIG. 2 is a plan view of the apparatus;

FIG. 3 is a view taken along lines III—III of FIG. 2;

FIG. 4 is a detailed view of a portion of the apparatus of FIG. 1;

FIG. 5 is a rear vertical perspective view of the apparatus of FIG. 1;

DESCRIPTION OF THE PREFERRED EMBODIMENT

Figure 1:
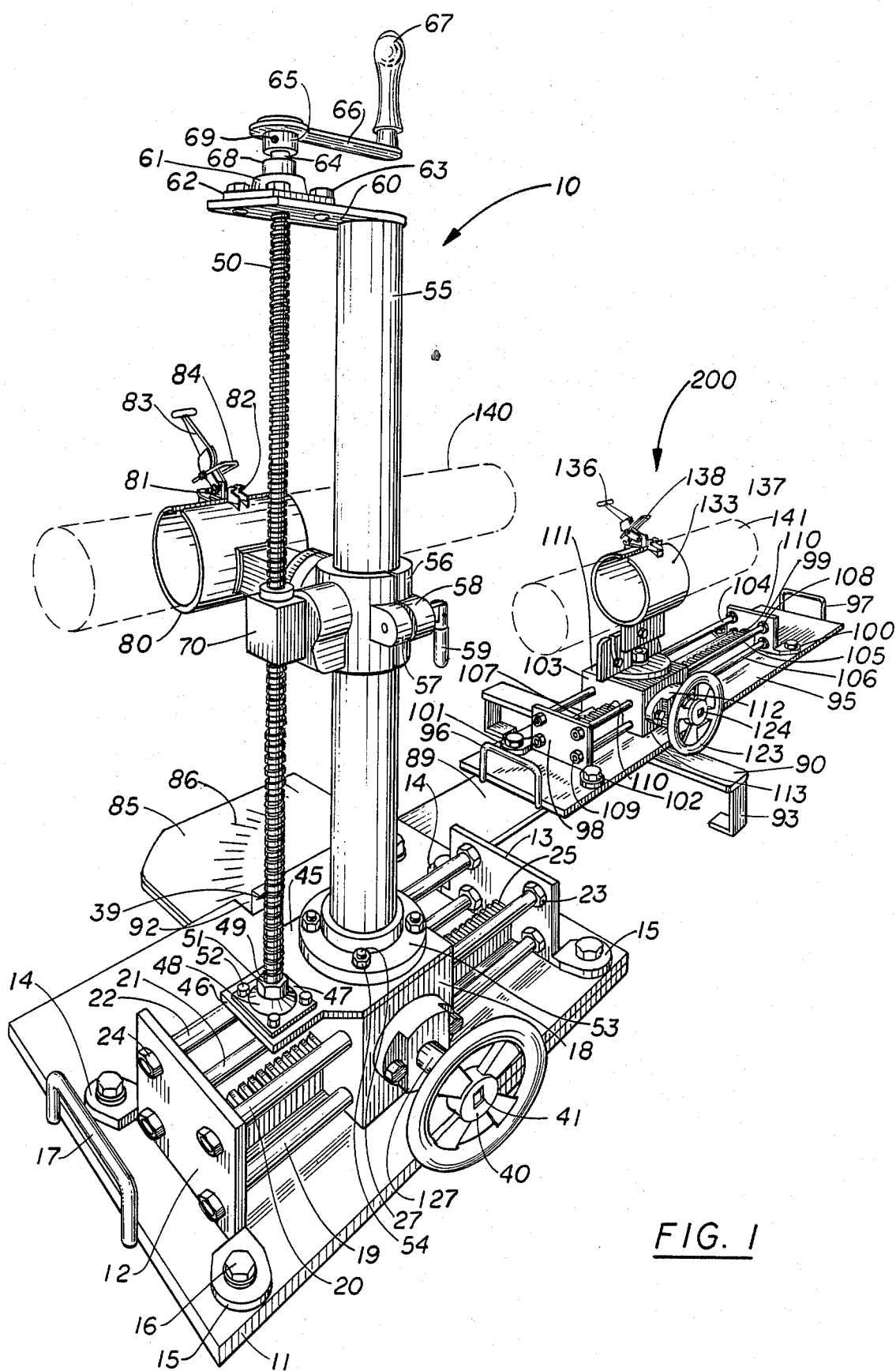
FIG. 1 is a vertical perspective view of apparatus in accordance with the teachings of the invention.

Referring now to FIG. 1 of the drawing, apparatus 10 is shown comprised of a flat generally horizontally extending rectangular base support plate 11 having at least a pair of spaced upstanding flange plates 12, 13 mounted thereon. Each flange plate 12, 13 has a pair of integral spaced flat horizontally extending leg flanges 14, 15 receiving a nut and bolt 16 extending upwardly through the bottom of plate 11 and through an aperture in each flange 14, 15 thus firmly and positively securing each flange 12, 13 to plate 11.

A U-shaped handle 17 may be welded or otherwise secured at one side of base plate 11 to provide means for grasping the same and moving the base plate 11 as will be discussed.

A box-like housing 18 is disposed above the upper surface of plate 11 (see also FIG. 3-plate 11 being omitted for convenience of illustration) and slidably mounted by means of four spaced rods 19 to 22 having threaded ends extending into apertures in end flange plates 12, 13. Suitable nuts 23 and 24 are threaded onto each rod 19 to 22 on the inside and outside of each plate 11, 12, respectively, as shown.

Rods 19 to 22 extend through aligned openings in housing 18 so that housing 18 is slidably mounted thereon. A rack gear 25 extends between plates 12, 13 (and through aligned openings in housing 18) having the free ends thereof welded or otherwise secured to the inner side walls of each end flange plate 12, 13. It is to be understood that housing 18 is hollow on the interior and closed off at top by a top wall 26 secured thereto in any suitable manner having a plurality, such as four, of upstanding threaded studs 27 at each corner thereof. These studs 27 may be threaded into suitable apertures in top plate 26.

An oval shaped boss 29 is provided on front wall 30 of housing 18 (FIG. 3) and a similar oval shaped boss 31 is provided on the rear wall 32 of housing 18 (FIG. 2). These bosses 29, 31 may be plates secured to each wall 30, 32 by suitable nuts and bolts 33. A crank shaft 34 (see the dotted lines in FIG. 2), extends transverse to rods 19 to 22 through suitable bearings 35, 36 in pillow blocks 29 and 31 (FIGS. 1 and 2, respectively) mounted in front and rear walls 30, 32 respectively. A pinion gear 32, having several teeth on the periphery thereof is fixedly secured to shaft 34 at the midpoint thereof (see the dotted lines in FIG. 2). As seen in FIG. 3, shaft 34 extends above rack gear 25 and pinion gear 37 meshes with rack gear 25.

As seen in FIG. 1, a crank handle 40 is mounted on the terminal end of shaft 34 having a central hole 41 similarly configured to shaft 34 receiving shaft 34 therein. Thus, rotation of handle 40 rotates shaft 34 with cam teeth 38, of pinion gear 37 meshing with rack gear 25 moving housing 18 back and forth along base plate 11 (FIG. 1) between side flange plates 12, 13. Handle 40 may be secured to shaft 34 in any suitable manner, and the opposite end of shaft 34 is secured by a lock member 42 threaded thereto. Suitable oil inlets 43, 44 may be provided at each end of housing 18 for lubricating the interior bearings 35, 36.

Referring once again to FIG. 1, a support plate 45 is mounted over top plate 26 receiving shafts 27 through aligned apertures therein. Plate 45 has an extension portion 46 extending laterally thereof and over above rods 20, 22 as shown. This extension portion 46 thereof supports thereon a flat flange plate 47 having a central apertured threaded boss 48 receiving therein the lower threaded end 49 of a threaded vertical shaft 50. A nut 51 threaded on end 49 secured shaft 50 in place in boss 48.

A plurality of nuts and bolts 52 extending through aligned apertures in the extension portion 46 of plate 45 and plate 47 securely holds plate 47 (and thus shaft 50) in position.

A circular apertured boss 53 is also mounted on top of plate 45 receiving shafts 27 through aligned apertures and secured thereto by nuts 54. A cylindrical rod 55 is mounted in apertured boss 53 extending vertically upward therefrom through a hollow tubular split sleeve 56 having mating integral ears 57, 58 receiving a releasable cloking lever 59 through aligned threaded apertures in each ear 57, 58. Selective actuation and release of lever 59 serves to move the ears 56, 57 together and apart and thus tighten split sleeve 56 about the periphery of rod 55 as is well known in the art. Thus, sleeve 56 is adjustable at any desired position along rod 55. Of course, any suitable release and tightening means may be provided, such as nuts and bolts threaded into the aligned apertures in ears 57, 58.

A flat plate 60 is secured to the top of rod 55, offset therefrom, in any suitable manner. As seen in FIG. 1, threaded shaft 50 extends up through a suitable aperture in plate 60, through the center of an apertured boss 61 of a plate 62 secured to plate 60 by suitable nuts and bolts 63. The uppermost end 64 of shaft 50 is received within a collar 65 of a lever 66 having a handle 67 connected thereto in any suitable manner. A spacer 68 may be provided between collar 65 and boss 61 and a set screw 69 may be provided with collar 65 for securing collar 65 (and thus integral lever 66 and handle 67) thereto so that rotation of handle 67 rotates shaft 50.

Shaft 50 also extends through a block 70 (see also FIG. 4) having a collar 71 at the top thereof and an integral nut 72 on one side thereof threaded to a threaded shaft 73 which is also threaded to a nut 74 of a spacer 75 integral with sleeve 56. Shaft 50 is threaded to mating threads interiorly of block 70 so that, when handle 67 (FIG. 1) is rotated, block 70 moves up and down on shaft 50, collar 56 sliding along rod 55.

As seen in FIG. 5, a circular flange 76 extends rearwardly from and is secured to extension member 77 at mating circular threaded flanges 78, 79, respectively, in any suitable manner. Indicia may be provided on flanges 78, 79 for indicating the orientation of member 77 with respect to flange 76 when one is rotated with respect to the other. The flanges 78, 79 may be locked together to maintain extension member 77 in any desired position. A hollow split sleeve 80 is integrally connected to extension member 77 having a locking lever 83 pivotally connected to a first flange 81 (see also FIG. 1) on one part of sleeve 80 adjacent the split therein having a pivotably mounted ball 84 for engaging a hooked member 82 on the other section of sleeve 80 for selectively opening and closing sleeve 80 and securing any pipe carried therein within sleeve 80.

Figure 6:
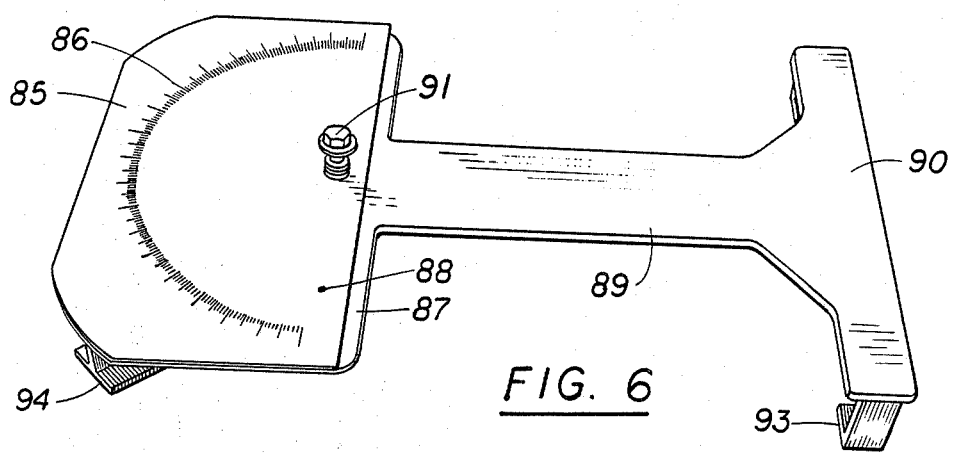
FIG. 6 is a perspective view of one component of the apparatus of FIG. 1 removed therefrom for convenience of illustration.

As seen in FIG. 1, a protractor 85 having indicia 86 is mounted on apparatus 10. FIG. 6 shows the protractor 85 removed from the remainder of apparatus 10. As seen in FIG. 6, protractor 85 is mounted to a flat plate 87 via screws or rivets 88 which plate is integral with a T-shaped member having an elongated arm 89 leading to a T-shaped plate 90. As seen in FIG. 5, plate 87 is secured to base plate 11 by a bolt, nut and washer combination 91 (or any suitable bearing means) extending through plate 87, protractor 85 and base plate 11 for securing the plates 87 and 11 together, with protractor 85 sandwiched therebetween, but permitting plate 87 to pivot about combination 91. Also, as seen in FIG. 5, a slot 92 is cut out of base plate 11 on one side thereof with a pointer 29 secured at its top and with indicia 86 aligned therewith so that the same is visible within slot 92 as plate 87 is pivoted or turned. Indicia 86 of course shows the degrees of angularity (0 degrees to 180 degrees) of plate 87 with respect to plate 11 as will be discussed.

As seen in FIG. 1, support legs 93, 94 (see also FIG. 6) may be provided at each end of T-shaped plate 90 for supporting the same on the ground or the like. Apparatus 200 consists of an elongated rectangular plate 95 (FIG. 1) having a U-shaped integral upright handle 96, 97 at each end is mounted on top of arm 89 and plate 90. Plate 95 may be unconnected to arm 89 and plate 90 or bolted thereto so that it is movable thereon in any suitable manner. A pair of spaced upstanding flange plates 98, 99 are mounted on the upper surface of plate 95 each having a pair of integral spaced flat horizontally extending leg flanges 100, 101 receiving a nut and bolt 102 through the bottom of plate 95 and through an aperture in each flange 100, 101 thus firmly and positively securing each flange 100, 101 to plate 95.

A box-like housing 103 is disposed above the upper surface of plate 95 and slidably mounted by means of four spaced rods 104 to 107 having threaded ends extending into apertures in end flange plates 98, 99. Suitable nuts 108, 109 are threaded onto each rod 104–107 on the inside and outside of each plate 98, 99, respectively, as shown.

Rods 104–107 extend through aligned openings in housing 103 so that housing 103 is slidably mounted thereon. A rack gear 110 extends between plates 98, 99 (and through aligned openings in housing 103) having the free ends thereof welded or otherwise secured to the inner side walls of each end of flange plates 98, 99. It is to be understood that housing 103 is hollow on the interior and closed off at top by a top wall 111 secured thereto in any suitable manner.

Figure 7:
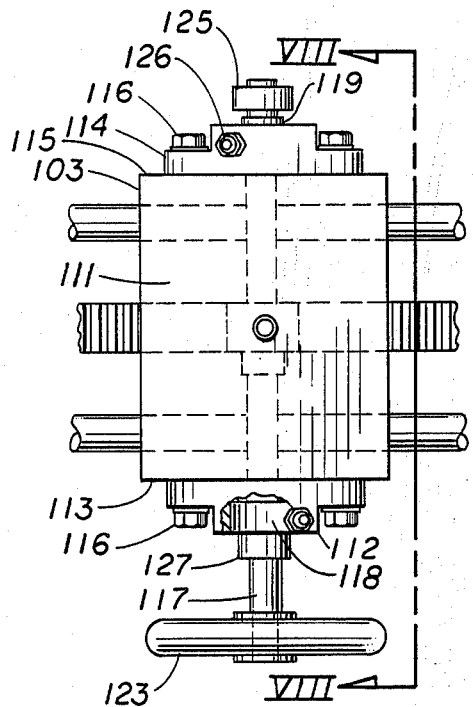
FIG. 7 is a top plan view of a portion of the apparatus of FIG. 1.

An oval shaped boss 112 is provided on front wall 113 of housng 103 and a similar oval shaped boss 114 (FIG. 7) is provided on the rear wall 115 of housing 103. These bosses 112, 114 may be plates secured to each wall 113, 115 by suitable nuts and bolts 116. A crank shaft 117 (similar to shaft 34 in FIGS. 1 and 2—see also FIG. 8), extends transverse to rods 104–107 through suitable bearings 118, 119 (FIGS. 1 and 8, respectively) internally mounted in front and rear walls 113, 115, respectively.

Figure 8:
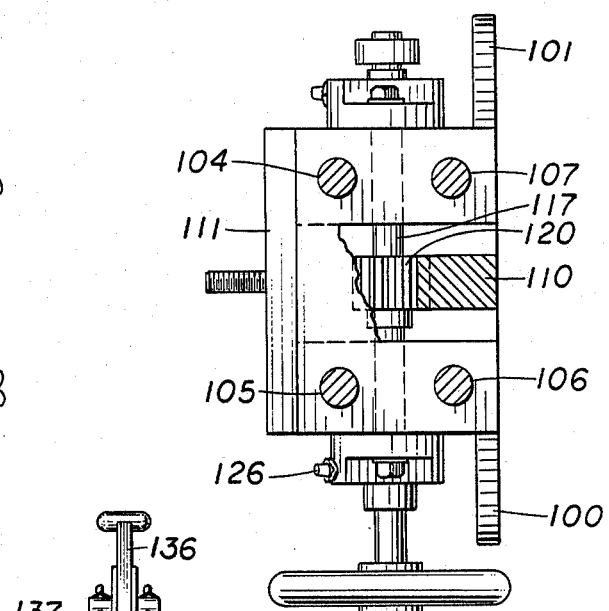
FIG. 8 is a front vertical view of a portion of the apparatus of FIG. 1.

A pinion gear 120 (FIG. 8) identical to pinion gear 37, having several teeth 121 on the periphery thereof is fixedly secured to shaft 117 at the midpoint thereof (similar to cam 37). As seen in FIG. 8, shaft 117 extends above rack gear 110 and pinion gear 120 engages and meshes with rack gear 110.

As seen in FIG. 1, a crank handle 123 is mounted on the terminal end of shaft 117 having a central hole 124 similarly configured to shaft 117 receiving shaft 117 therein. Thus, rotation of handle 123 rotates shaft 117 with gear teeth 121, of pinion gear 120 meshing with gear 110 moving housing 103 back and forth above base plate 95 (FIG. 1) between side flange plates 100, 101. Handle 113 may be secured to shaft 117 in any suitable manner, and the opposite end of shaft 117 may be secured by a lock member 125 (FIG. 6) threaded thereto. Suitable oil inlets 126 may be provided at each end of housing 103 for lubricating the interior of bearings 118, 119. Suitable spacers, such as spacer 127 (FIG. 1) may be associated with each handle 40, 123.

Figure 9:
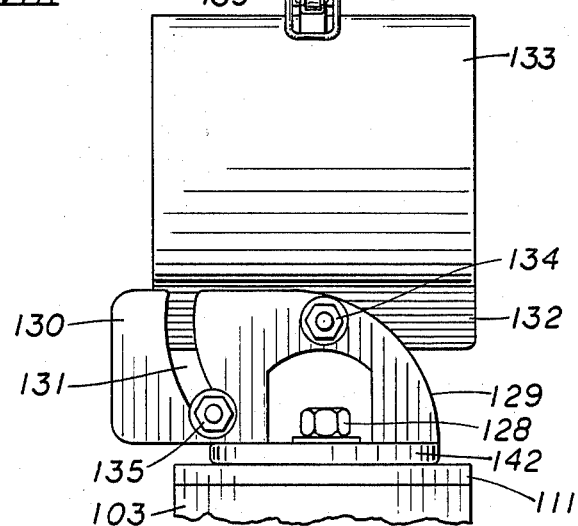
FIG. 9 is a perspective side view of a portion of the apparatus of FIG. 1.

As seen in FIG. 9, a circular flange plate 142 is mounted on top wall 111 of housing 103 by nut and bolt 128 having a semi-circular upstanding vertical flange 129 integral therewith. Flange 129 includes a lateral extension portion 130 having an arcuate slot 131 therein. The bottom flat planar flange 132 of a cylindrical split sleeve 133 is secured to flange 129 by a washer, nut and bolt assembly 134. A second washer, nut and bolt assembly 135 secures flange 132 within slot 131 so that sleeve 133 is arcuately adjustable. A locking lever 136 (see also FIG. 1) is pivotably connected to a first flange 137 on one section of sleeve 133 adjacent the split therein having a pivotally mounted ball 138 sleeve for engaging a hooked member 139 mounted on the opposite side of the split in the selectively opening and closing sleeve 133 and securing any pipe carried therein within sleeve 133.

The reader's attention is turned to a few details concerning information previously set forth. Thus with respect to parts 76–78, and 79 it is to be seen that flange 78 will preferably have a marking indicator thereupon, and that in the preferred mode flange 79 would have markings set out in 1 degree to 90 degree increments in both directions, for ease of understanding and calculations by lay personnel.

As to the elongated rectangular plate 95, seen in FIG. 1, it is fixedly secured to the arm 89 & plate 90 as by bolting. However it can be unbolted and rotated for right angle adjustments.

The reader's attention is now turned to FIG. 6, and specifically to arm 89 that leads to T-shaped plate 90. The arm serves as a bolting base for the base plates 11 and 95 aforesaid, and the T-shape configuration helps to distribute the weight for overall balance of the apparatus of this invention.

OPERATION

In operation, the pipe sections desired to be joined together are simulated by placing two pipe sections 140, 141 (dotted lines in FIG. 1) in each sleeve 80 and 133 with levers 83 and 136 actuated to lock the same therein. Release of lever 59 in collar 56 allows rotation of handle 67 to turn screw shaft 50 to raise and lower pipe section 140. Lever 59 can be locked when the desired elevation is reached. The longitudinal axis of section 140 can be rotated by lifting handle 17 and pivoting plate 11 about protractor 85, the desired angularity being determined in slot 92. Rotation of handle 40 moves housing 18 back and forth along rods 19–22 due to the engagement of pinion gear 37 with rack gear 25. Thus, the pipe section 140 can be moved inwardly and outwardly with respect to pipe section 141.

Pipe section 141 can also be moved inwardly and outwardly toward pipe section 140 by rotating handle 123 moving housing 103 back and forth along rods 104–107 due to the engagement of pinion gear 120 with rack gear 110. The angularity of the longitudinal axis of pipe section 141 can be varied by selective loosening and tightening of nut, bolt and washer assembly 135 within slot 131. Of course, the entire plate 95 can be lifted via handles 96, 97 and moved along extension arm 89 back and forth to and from pipe section 140 or arcuately with respect thereto.

Thus, the location of two separate unconnected pipe sections in the field can be determined by measuring the spacing and angularity therebetween and translating the same to the pipe section 140, 141 on apparatus 10 thus simulating the actual field conditions.

A pipe connection can thus be quickly and easily made up once sections 140, 141 are aligned using the field parameters.

The apparatus herein quickly and easily sets up any angle and/or any dimensions both horizontally and vertically for connecting two pieces of pipe. The apparatus can be used to connect up any round pipe, gas, water, stream, etc. The sleeves 80, 133 are adjustable to accommodate pipe within a predetermined dimension and, obviously, sleeves of different internal diameters can be quickly and easily substituted for sleeves 80, 133 to accommodate pipe of different diameters. The apparatus described herein avoids the use of trail and error which is time consuming. The apparatus herein can be used as a classroom training tool for fitting pipe in the field. The apparatus can be used to teach a journeyman pipe fitter how to make proper measurements so that he can use this training in actual field conditions.

Any suitable dimensions or materials can be used and any type of connectors, bearings, etc. may be used. The apparatus disclosed herein can be used to take two sections of pipe and suspend them in midair on apparatus 10. The orientation of these sections with respect to each other can be adjusted quickly and easily. The apparatus 10 enables the user to determine what angular relationships he is working with and enables the user to determine the techniques and parameters for solving the interconnection of two sections. The apparatus can be used practically by pipe fitters or by teachers as a teaching tool. The use of different methods and techniques can be demonstrated on the apparatus. Since there is no one way to connect two independent non-connected pipe sections, all methods can be demonstrated on the apparatus. A coupling member can be fabricated using the techniques demonstrated and tested on the apparatus.

It can be seen that there is disclosed apparatus for teaching and determining the coupling required between two separate independent pipe sections. Although a specific embodiment of the invention is disclosed, other means for carrying out the teachings of the invention may occur to an artisan and the invention is to be limited only by the scope of the appended claims.

Since certain changes may be made in the above apparatus without departing from the scope of the invention herein involved, it is intended that all matter contained in the above description and shown in the accompanying drawings shall be interpreted as illustrative and not in a limiting sense.

I claim:

1. Apparatus for determining the proper measurements for interconnecting a pair of separate unconnected pipe sections comprising:
   a main planar support;
   a main housing laterally movable along said main support;
   a vertical post upstanding from said main housing having a first pipe section holder thereon vertically movable therealong;
   first pipe section holder moving means on said main housing associated with said post for selectively moving said first pipe section holder vertically along said post;
   a planer sub-support spaced from said main planar support;
   a sub-housing mounted on said sub-support and laterally movable therealong; and
   a vertical flange member upstanding from said sub-housing having a second pipe section holder thereon and angularly adjustable with respect to said vertical flange member whereby separate unconnected pipe sections may be secured in each of said first and second pipe section holders and the parameters for interconnecting said pipe sections may be quickly and easily determined.

2. In the apparatus of claim 1 wherein said first pipe section holder is adjustable within a circular plane with respect to said post.

3. In the apparatus of claim 1 wherein said main planar support is rotatably mounted to a protractor for determining the angular relationship of said main planar support with respect to said protractor when rotated in its horizontal plane.

4. In the apparatus of claim 1 wherein said sub-support is movable in a direction to and from said main planar support.

5. In the apparatus of claim 1 wherein both of said pipe section holders are open-ended split cylinders for receiving a pipe section therein with clamping means associated therewith for clamping a pipe section therein.

6. In the apparatus of claim 1 wherein each of said housings is laterally movable on its respective support by a pair of spaced upstanding vertical flanges on each support interconnected by a plurality of rods, said rods extending through the respective housing with a shaft also extending through each housing, each shaft having a cam fixed thereon engaging a worm gear mounted between each pair of spaced flanges whereby rotation of each shaft moves each respective housing laterally along said respective worm gear.

7. In the apparatus of claim 6 including a crank handle keyed to each shaft out of each of said housings for rotating each of said shafts.

8. In the apparatus of claim 1 wherein said moving means includes a threaded shaft extending upwardly from said main support spaced from said post and rotatable with respect to the main planar support, a flange on the upper end of said post interconnecting the same to the upper end of said threaded shaft, said threaded shaft extending through said flange and a handle keyed to he free end thereof for selectively rotating the same.

9. In the apparatus of claim 8 wherein said moving means further includes a block member having said threaded shaft extending therethrough and threaded thereto for rotation therewith, said block member being secured to said first pipe section holder.

10. In the apparatus of claim 1 wherein said first pipe section holder includes a split sleeve encircling said post with split sleeve clamping means associated therewith for selectively releasing and clamping the same to said post.

11. In the apparatus of claim 10 wherein said first pipe section holder includes a split open-ended cylinder rotatably coupled to said split sleeve, and cylinder clamping means associated with said cylinder for clamping and releasing a pipe section held within said cylinder.

12. In the apparatus of claim 1 wherein a planar protractor having indicia thereon is pivotally mounted below said main planar support, said main planar support having a notch along one side thereof whereby said indicia is visible through said notch when said main planar support is rotated with respect to said protractor.

13. In the apparatus of claim 1 wherein said vertical flange member is angularly adjustable by means of a first flange on said sub-housing having a arcuate notch therein with said vertical flange secured thereto, and an adjusting nut receivable in said notch engaging both said vertical flange member and said notched flange for selectively securing said vertical flange member and said notched flange for selectively securing said vertical member in an angular relationship with respect to said sub-housing.

* * * * *